US008220765B2

(12) United States Patent
Bailey (10) Patent No.: US 8,220,765 B2
(45) Date of Patent: Jul. 17, 2012

(54) SPRING COUNTERBALANCE FOR ROTATING LOAD

(75) Inventor: David W. Bailey, Portola Valley, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 1032 days.

(21) Appl. No.: 12/144,537

(22) Filed: Jun. 23, 2008

(65) Prior Publication Data

US 2009/0314131 A1   Dec. 24, 2009

(51) Int. Cl.
| A47H 1/10 | (2006.01) |
| E05D 13/00 | (2006.01) |
| A47F 5/00 | (2006.01) |
| A47F 7/00 | (2006.01) |
| F16M 11/00 | (2006.01) |
| F16M 13/00 | (2006.01) |
| E04G 3/00 | (2006.01) |

(52) U.S. Cl. ...... 248/325; 248/334.1; 248/364; 248/125.2; 248/123.11; 248/162.1; 248/280.11; 248/648; 248/292.11; 414/601; 414/602; 414/673; 414/719; 414/720; 901/48

(58) Field of Classification Search ............ 248/325, 248/334.1, 364, 125.2, 123.11, 162.1, 280.11, 248/648, 572, 297.11, 292.13, 292.11, 284.1, 248/291.1; 414/601, 602, 673, 719, 720; 901/48; 212/195

See application file for complete search history.

(56) References Cited

U.S. PATENT DOCUMENTS

| 1,638,938 A | 8/1927 | Koenigkramer |
| 1,644,231 A | 10/1927 | Bosworth |
| 2,076,446 A | 4/1937 | Carwardine |
| 2,090,439 A | 8/1937 | Carwardine |
| 2,131,693 A | 9/1938 | Smith |
| 2,287,577 A | 6/1942 | Stava |
| 2,377,889 A | 6/1945 | La Coste et al. |
| 2,416,910 A | 3/1947 | Crosby |
| 2,547,532 A | 4/1951 | Medelsohn |
| 2,700,524 A | 1/1955 | Lauterbach |
| 2,941,776 A | 6/1960 | Lauterbach |
| 3,000,606 A | 9/1961 | Storm |
| 3,041,060 A | 6/1962 | Jacobsen |
| 3,122,348 A | 2/1964 | Wilkinson |

(Continued)

OTHER PUBLICATIONS

Vertut, Jean et al., *Robot Technology: Teleoperation and Robotics Evolution and Development*, 1986, vol. 3A, 332 pages, English translation Prentice-Hall, Inc., Inglewood Cliffs, NJ, USA.

(Continued)

*Primary Examiner* — Terrell McKinnon
*Assistant Examiner* — Christopher Garft (57) ABSTRACT

A counterbalance mechanism counterbalances an eccentric mass on a rotating shaft supported by a frame. A first pulley is coupled to and concentric with the shaft. An arm is coupled to the shaft to rotatably support a second at a first distance from the first pulley. A third pulley is fixedly coupled to the frame at a second distance from the first pulley. A fourth pulley is rotatably coupled to and concentric with the third pulley. A spring is fixed at a first end to the frame and has a second end that is coupled to the fourth pulley such that the spring provides a restoring force as the fourth pulley is rotated. A first cable has a first end that is coupled to the fourth pulley and a second end that is coupled to the frame through the third pulley after passing over the first and second pulleys.

24 Claims, 6 Drawing Sheets

U.S. PATENT DOCUMENTS

| | | |
|---|---|---|
| 3,374,347 A | 3/1968 | Hirose |
| 3,393,889 A * | 7/1968 | Ogden .......................... 248/364 |
| 3,426,190 A | 2/1969 | Bobrick |
| 3,476,931 A | 11/1969 | Fletcher |
| 3,547,390 A | 12/1970 | Mehr |
| 3,584,793 A | 6/1971 | Ilzig |
| 3,713,453 A | 1/1973 | Chiaro |
| 3,820,752 A | 6/1974 | Oram |
| 3,856,251 A | 12/1974 | Miller |
| 3,883,105 A | 5/1975 | Matsumoto |
| 4,080,530 A | 3/1978 | Krogsrud |
| 4,107,769 A | 8/1978 | Saluja |
| 4,160,536 A | 7/1979 | Krogsrud |
| 4,165,530 A | 8/1979 | Sowden |
| 4,166,602 A | 9/1979 | Nilsen |
| 4,266,747 A * | 5/1981 | Souder et al. ............ 248/280.11 |
| 4,437,144 A | 3/1984 | Guenther |
| 4,494,177 A | 1/1985 | Matthews |
| 4,500,251 A * | 2/1985 | Kiryu et al. ................... 414/719 |
| 4,517,632 A | 5/1985 | Roos |
| 4,523,732 A | 6/1985 | Biber |
| 4,744,019 A | 5/1988 | Krogsrud |
| 4,770,384 A | 9/1988 | Kuwazima |
| 5,025,359 A | 6/1991 | Saluja |
| 5,186,337 A | 2/1993 | Foster |
| 5,253,832 A * | 10/1993 | Bolas et al. .............. 248/123.11 |
| 5,333,103 A | 7/1994 | Cvek |
| 5,340,072 A | 8/1994 | Halbirt |
| 5,348,260 A | 9/1994 | Acevedo |
| 5,538,214 A * | 7/1996 | Sinila .......................... 248/278.1 |
| 5,609,316 A * | 3/1997 | Tigliev ...................... 248/123.11 |
| 5,618,090 A | 4/1997 | Montague |
| 5,667,186 A * | 9/1997 | Luber et al. ................... 248/550 |
| 6,012,821 A | 1/2000 | Yeaney |
| 6,378,829 B1 * | 4/2002 | Strater et al. ................ 248/276.1 |
| 7,428,855 B2 * | 9/2008 | Duval .............................. 74/516 |
| 2004/0035243 A1 * | 2/2004 | Duval .............................. 74/589 |
| 2007/0156122 A1 | 7/2007 | Cooper |

OTHER PUBLICATIONS

Tariq Rahman, "A Simple Technique to Passively Gravity Balance Articulated Mechanism", Transcript of the ASME J. of Mechanical Design, 1995.

Just Herder; Energy-fre Systems Theory, conception and design of statically balanced spring mechanism. PhD-Thesis, Delft University of Technology, Delft, The Netherlands, Nov. 2001.

* cited by examiner

SPRING COUNTERBALANCE FOR ROTATING LOAD

BACKGROUND

1. Field

Embodiments of the invention relate to the field of counterbalance mechanisms; and more specifically, to spring force counterbalance mechanisms for rotating loads.

2. Background

In load positioning systems the effects of gravity on the load may be compensated for with a counterbalance or counterweight, a constant-force spring, or a pneumatic equilibrator. A counterweight is often undesirable due to its large size or to the weight and inertia that it adds to the system. In many situations a constant force spring is not capable of generating a sufficient compensating force. These springs have innately high stresses which induce metal fatigue. Consequently, the springs have a relatively short dynamic life span. The disadvantage of pneumatic equilibrators is that they are long and bulky and generally have to be made on a custom basis.

In a load positioning system with a servomechanism the servo amplifier may be biased in an attempt to compensate for the force of gravity. This procedure is not optimum inasmuch as it only reduces the steady-state error. When the bias is added, the maximum acceleration and maximum velocity remain asymmetrical—that is, the acceleration and the velocity in the direction opposite the gravity vector are less than the acceleration and the velocity in the direction of the gravity vector. Motor selection must therefore be made according to the performance demands of the worst case. This results in greater apparatus cost, volume and weight. Additionally, the extra load of the bias force going through the load positioning system's transmission will increase the friction in the joint.

Static balancing systems incorporating springs may be advantageous because they do not add an undue amount of weight and inertia. A spring balance system may offer the advantage of not requiring external power. However it can be difficult to provide a spring balance system for a load that rotates freely on a shaft. For example, U.S. Patent Application 2007/0156122 shows a spring balance system that can balance a pivoted arm where the arm moves through less than one-half of a revolution. U.S. Patent Application 2004/0035243 shows a spring balance system that can balance a pivoted arm where the arm can rotate freely but the spring balance system must be connected to an unobstructed end of the rotating shaft that supports the load.

It would be desirable to provide static balancing systems incorporating springs that can be coupled in the middle of the shaft that supports the load and permit the shaft to rotate freely.

SUMMARY

A counterbalance mechanism counterbalances an eccentric mass on a rotating shaft supported by a frame. A first pulley is coupled to and concentric with the shaft. An arm is coupled to the shaft to rotatably support a second pulley at a first distance from the first pulley. A third pulley is fixedly coupled to the frame at a second distance from the first pulley. A fourth pulley is rotatably coupled to and concentric with the third pulley. A spring is fixed at a first end to the frame and has a second end that is coupled to the fourth pulley such that the spring provides a restoring force as the fourth pulley is rotated. A first cable has a first end that is coupled to the fourth pulley and a second end that is coupled to the frame through the third pulley after passing over the first and second pulleys.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known devices, structures and techniques have not been shown in detail in order not to obscure the understanding of this description.

Figure 1:
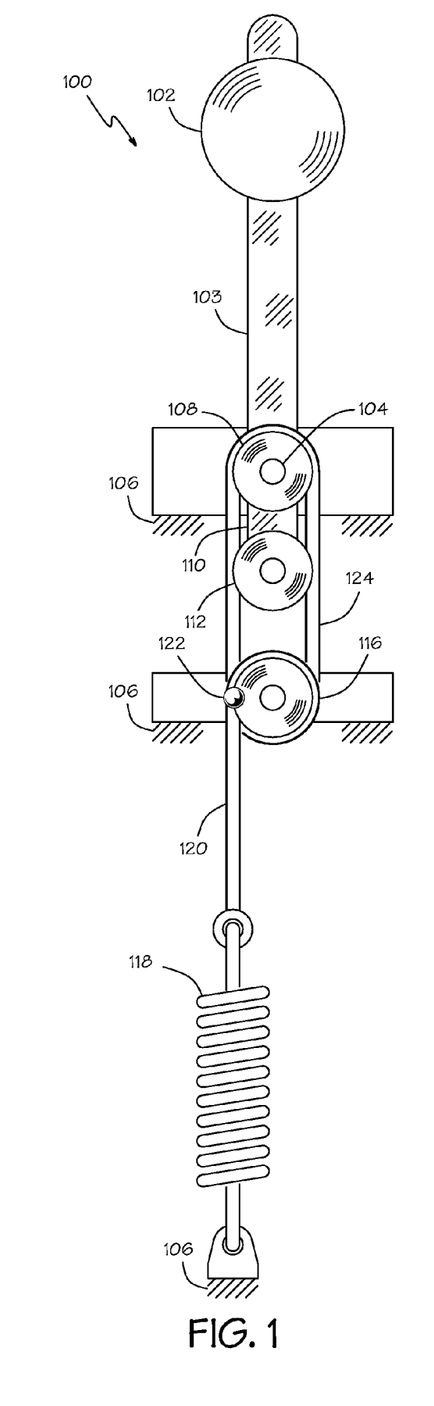
FIG. 1 is a front view of a counterbalanced system that embodies the invention.
Figure 2:
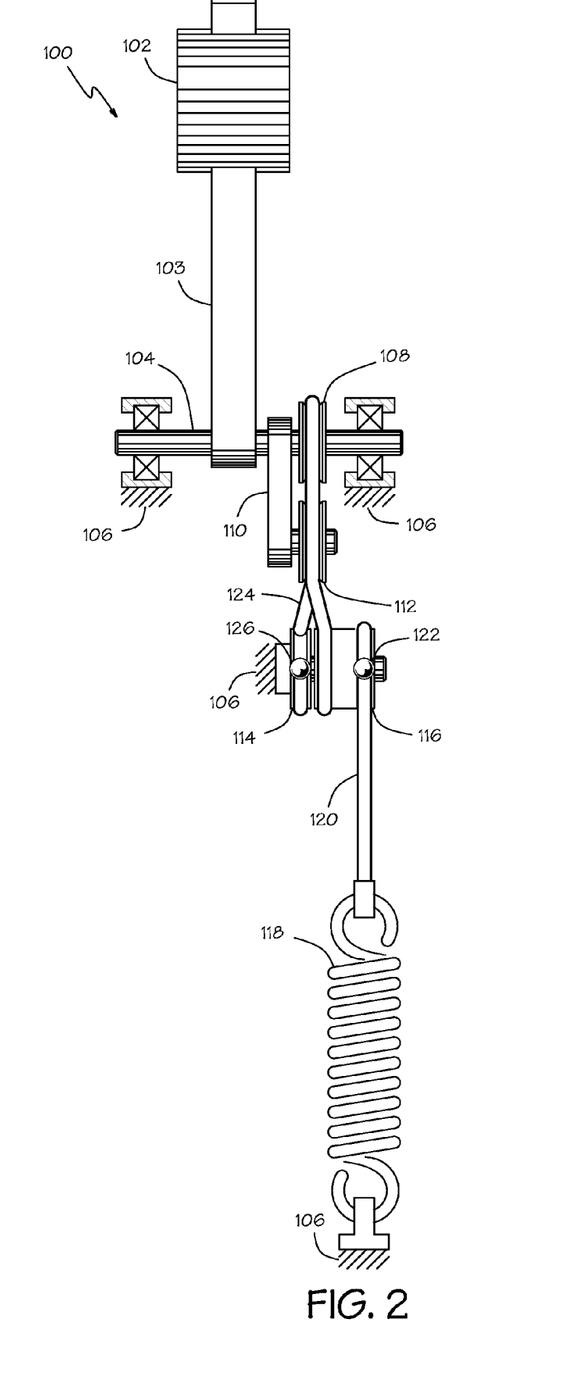
FIG. 2 is a side view of the counterbalanced system shown in FIG. 1.

FIGS. 1 and 2 show a rotating counterbalanced system 100 that embodies the invention. FIG. 1 is a front view of the system and FIG. 2 is a side view. A load in the form of an eccentric mass 102 is coupled by a link 103 to a rotating shaft 104 supported by a frame 106 that provides a ground reference for the system. The rotating shaft 104 may be supported by bearings that are coupled to the frame. The portion of the frame 106 that supports the front end of the rotating shaft 104 is not shown in the front view of FIG. 1 to allow details of the embodiment to been seen more clearly.

A first pulley 108 is coupled to and concentric with the shaft 104. An arm 110 is coupled to the shaft 104 adjacent the first pulley 108. A second pulley 112 is rotatably coupled to the arm 110 at a first distance from the first pulley 108. A third pulley 114 is fixedly coupled to the frame 106 at a second distance from the first pulley 108. The third pulley 114 is coupled to the frame 106 such that the third pulley does not rotate. A fourth pulley 116 is rotatably coupled to and concentric with the third pulley 114. The four pulleys have substantially the same root diameter.

A spring 118 is fixed at a first end to the frame 106. A second end of the spring 118 is coupled to the fourth pulley 116 such that the spring provides a restoring force as the fourth pulley is rotated. In the exemplary embodiment shown, a tension spring 118 is coupled to the frame 106 at a first end and coupled to the fourth pulley 118 at a second end of the spring by a cable 120 to provide the restoring force. The cable 120 may be coupled to the fourth pulley 118 by engaging a protrusion, such as a ball or a cylinder joined to the cable, in a mating opening on the pulley, by clamping the cable to the pulley, or by other means that prevent relative motion between the cable and the pulley. While an extension spring has been shown in the exemplary embodiment shown in the Figures, it will be appreciated that the spring may take other forms, such as a compression spring or a spiral spring, that provide a restoring force to the fourth pulley 116.

A cable 124 having a first end 122 that is coupled to the fourth pulley 116 passes over the first 108 and second 112 pulleys and a second end 126 is coupled to the frame 106 through the third pulley 114. The first cable 124 and the second cable 120 may be portions of a single cable with the first end of the first cable portion adjacent the first end of the second cable portion. The cable 124 may be coupled to the third 114 and the fourth 118 pulleys by engaging a protrusion, such as a ball or a cylinder joined to the cable, in a mating opening on the pulley, by clamping the cable to the pulley, or by other means that prevent relative motion between the cable and the pulley.

Figure 3:
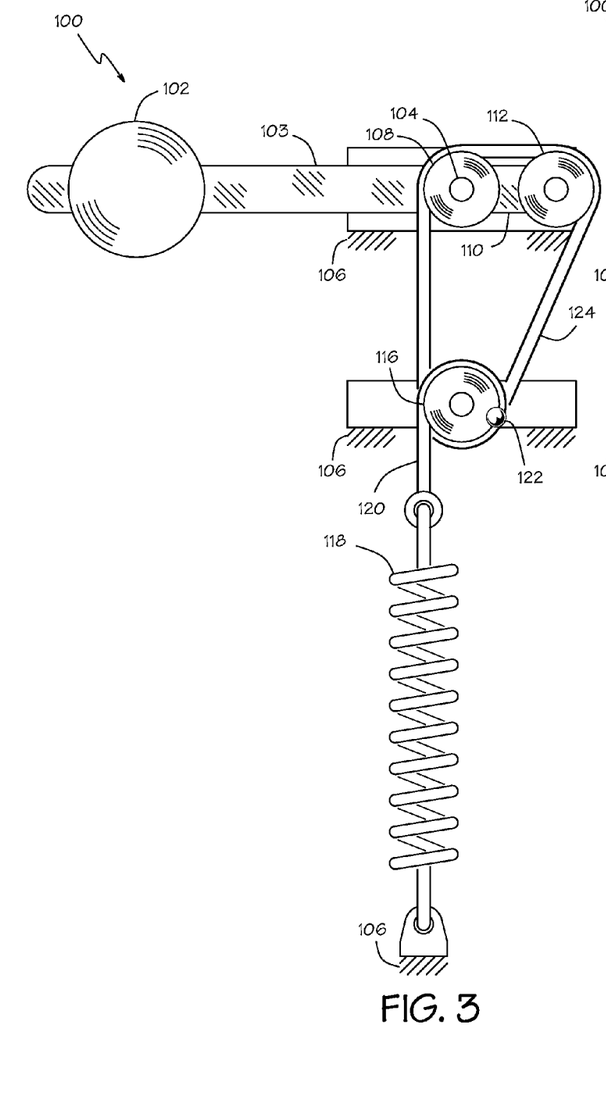
FIG. 3 is a front view of the counterbalanced system shown in FIG. 1 with the load in another position.
Figure 4:
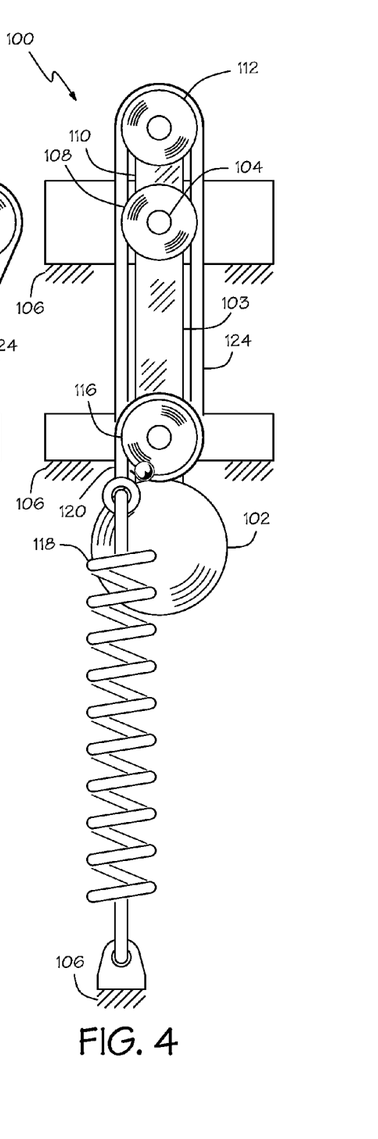
FIG. 4 is a front view of the counterbalanced system shown in FIG. 1 with the load in yet another position.
Figure 5:
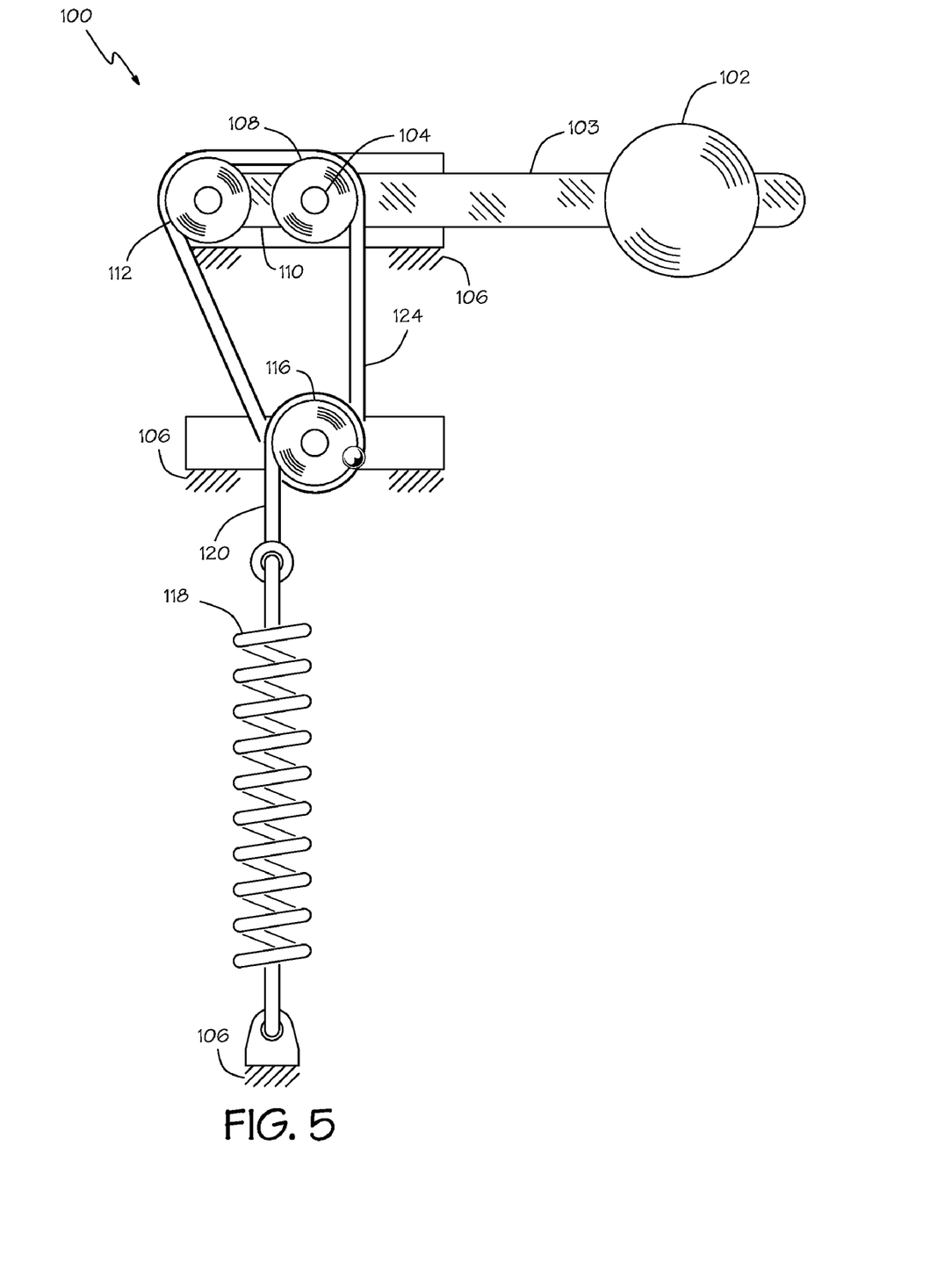
FIG. 5 is a front view of the counterbalanced system shown in FIG. 1 with the load in still another position.

FIGS. 3, 4, and 5 are front views of the rotating counterbalanced system 100 showing the load 102 in various rotational positions. It will be seen from the various views that the second pulley 112 rotates with the arm 110 about the center of the first pulley 108 and the rotating shaft 104 that supports the load 102. It will also be seen that the second pulley 112 engages a loop formed by the first cable 124. The loop of cable is made up of three segments. A first segment extends between the first 108 and second 112 pulleys. The length of the first segment is fixed because the first 108 and second 112 pulleys are separated by a first distance as determined by the arm 110. A second segment extends between the first 108 and third 114 or fourth 116 pulleys. The length of the second segment is also fixed because the first 108 and third 114 pulleys are separated by a second distance as determined by the frame 106; the fourth 116 pulley is located concentrically with the third 114 pulley. If the second distance is sufficiently greater than the first distance the second pulley will be able to pass the third pulley as the arm rotates allowing the shaft to rotate freely.

A third segment extends between the second 112 and the other of the third 114 or fourth 116 pulleys. The length of the third segment changes as the shaft 104 and the coupled arm 110 and second pulley 112 rotate. In the embodiment shown in FIG. 3, the third segment extends between the second 112 and the third 114 pulley. In the embodiment shown in FIG. 5, the third segment extends between the second 112 and the fourth 116 pulley. As the second pulley 112 crosses the line where all four pulleys are in a line as shown in FIGS. 1 and 4, the third segment is transferred between the third 114 and fourth 116 pulleys. As best seen in FIG. 2, there is a fleet angle as the cable 124 comes off the second pulley 112. As the third segment is transferred, the second pulley 112 has to pickup the cable 124 and force it to provide a larger fleet angle when the second pulley is closest to the third 114 and fourth 116 pulleys. The first pulley has to perform a similar function when the second pulley is furthest from the third 114 and fourth 116 pulleys as shown in FIG. 4. The first 108 and second 112 pulleys may be provided with a wider and deeper cable groove to assist with the changes in fleet angle as the third segment is transferred.

The first cable 124 is placed in tension by the fourth pulley 116 as the fourth pulley is rotated because the spring 118 is coupled to the fourth pulley such that the spring provides a restoring force. The cables 124, 120 will have a tension that is substantially the same as the spring force exerted by the spring 118. Since the first pulley is a fixed distance from the second 112 and from the third 114 and fourth 116 pulleys, the tension in the segments of cable between those pulleys bears against rigid structures. However, as the shaft 104 rotates and the second pulley 112 moves relative to the third 114 and fourth 116 pulleys, the tension in the segment of cable between those pulleys exerts a force that tends to pull the second pulley toward the third and fourth pulleys. It will be appreciated that an eccentric load 102 that is generally diametrically opposite the second pulley 112 will create a gravitational force that tends to push the second pulley away from the third 114 and fourth 116 pulleys. As will be shown, the spring 118 may be configured to substantially counteract the gravitational force of the load 102 throughout the full range of rotational movement.

Springs generally exert a force that closely follows Hooke's Law where the force is directly proportional to the extension or compression of the spring. "Zero-length spring" is a standard term for a spring that exerts zero force when it has zero length. A zero-length spring can be constructed by combining a real spring having a finite length with a length of inelastic material to place the spring outside a line that connects two points between which the spring force acts. It will be appreciated that a portion of the cable that extends from the second pulley 112 to either the third 114 or fourth 116 pulley can be configured to approximate a zero-length spring.

Real tension springs often are constructed such that the coils press together when the spring is unloaded and thus require a slight amount of initial tension to be applied before there is an initial elongation of the spring. As a result, a real tension spring may have an initial length when no tension is applied that is longer than the free length which would be the theoretical length of the spring where the spring exerts zero force. A zero-length spring constructed from a real spring may therefore approximate the ideal force-length relationship where the force is directly proportional to the length of the spring and have an initial length with an initial force proportional to the initial length. The constructed zero-length spring need not be capable of having a zero-length. It is only necessary that the force-length relationship be such that if the length of the constructed zero-length spring was zero, the extrapolated force would be zero.

Figures 6, 7, 8:
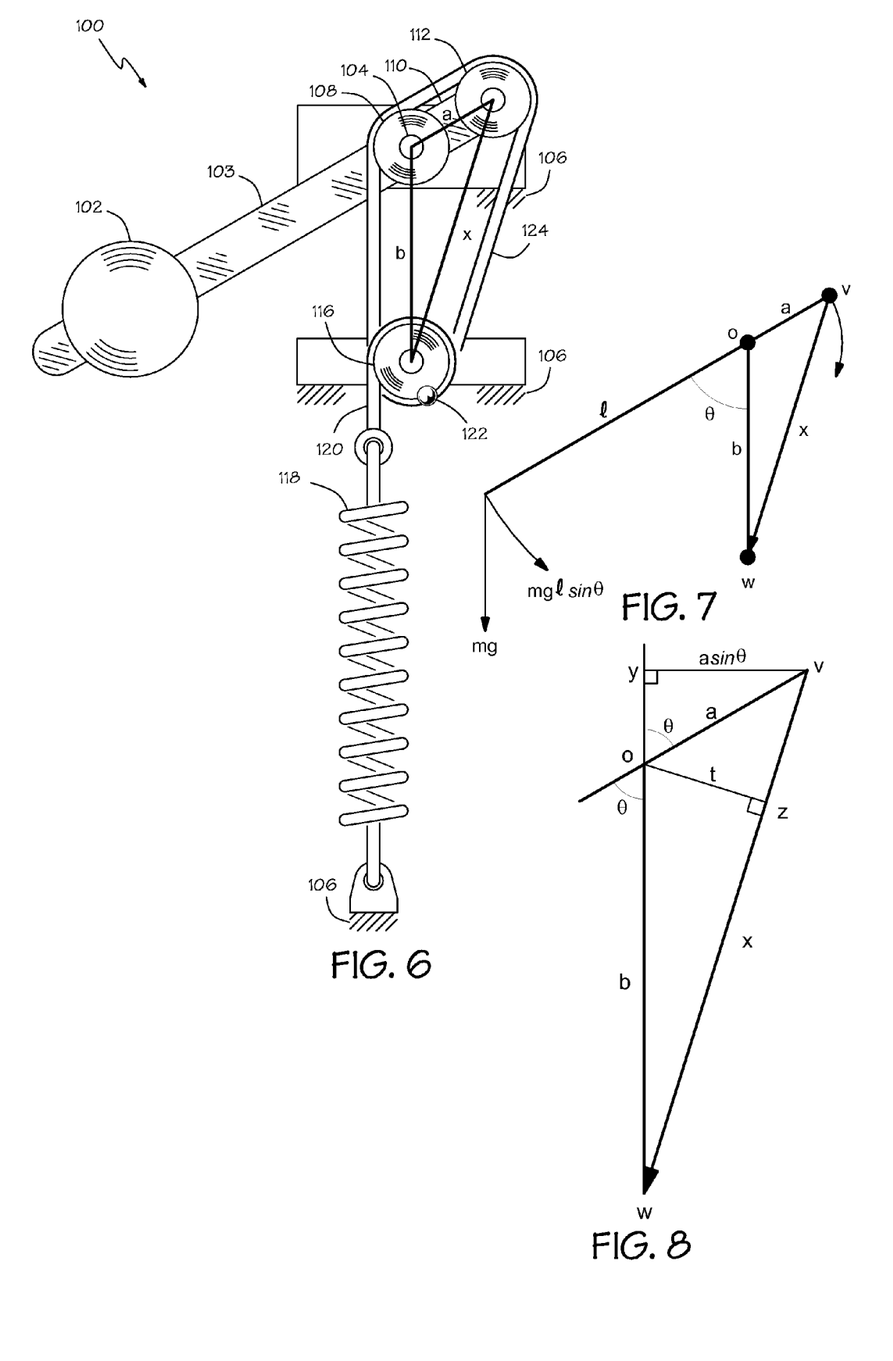
FIG. 6 is a front view of the counterbalanced system shown in FIG. 1 with the load in an arbitrary position for analyzing forces.
FIG. 7 is a schematic force diagram of the counterbalanced system shown in FIG. 6.
FIG. 8 is a schematic force diagram of the spring counterbalance portion of the counterbalanced system shown in FIG. 6.

The spring force of the counterbalance mechanism will now be analyzed with reference to FIGS. 6-8. FIG. 6 is a front view of the rotating counterbalanced system 100 showing the load 102 in an arbitrary rotational position. The load 102 may be balanced by a counter balancing force created by the spring 118 with an appropriate choice of spring constant K and applied through the cables 120, 124. Both the load 102 and the counterbalance mechanism rotate on the shaft 104 supported by the frame 106.

FIG. 7 is a schematic diagram showing the forces generated by the components shown in FIG. 6. The load 102 produces a force due to the gravitational force acting on the mass of the load and the force is equal to the mass m times the acceleration of gravity g as suggested by the downward pointing vector (f=mg). The load 102 is pivotally supported by the shaft 104 and the load therefore creates a rotational moment that is equal to the gravitational force mg times the distance from the center of rotation to the center of mass for the load/times the sine of the angle theta θ between the load arm and a vertical reference as suggested by the rotational vector (mgl sin θ) at the left of FIG. 7. The rotational moment created by the load is counterbalanced by a moment created by the counterbalance mechanism as suggested by the rotational vector at the right of FIG. 7.

Referring to FIG. 6, as the load 102 rotates on the shaft 104, the second pulley 112 will be rotated about the shaft because it is coupled to the shaft by the arm 110. The first cable 124 forms a loop around the pulleys 108, 112, 114, 116 and the rotation of the second pulley about the shaft causes the cable loop to form a triangle of varying geometries. The spring force exerted by the real spring 118 on the cables 120, 124 puts the cables in tension with substantially the same force as exerted by the real spring, namely the spring constant K multiplied by the extension of the real spring from its free length, plus any initial tension in the spring. Thus the segment of the first cable 124 that extends between the second pulley 112 and the third 114 or fourth 116 pulley acts as an effective spring with a spring constant K.

Pulleys are provided in the counterbalance mechanism to avoid excessive stresses in the cable as it bends to change direction. It will be appreciated that the segments of the triangular cable loop that extend from one pulley to another have the same length and are parallel to imaginary lines that connect the centers of the pulleys. Therefore we may analyze the counterbalance forces with reference to the triangle formed by the imaginary lines shown as triangle ovw in FIG. 7. The center of the first pulley 108 is represented as point o, the center of the second pulley 112 as point v, and the centers of the third 114 and fourth 116 pulleys as point w. Because the root diameters of the four pulleys are substantially the same, the length of cable that it wrapping around the pulleys is constant and it is not necessary to consider the portion of the cables 120, 124 that wrap around the pulleys when analyzing the forces. Ideally the cable paths for the third 114 and fourth 116 pulleys would lie in the same plane as the cable paths of the first 108 and second 112 pulleys and the cable path will be treated as though this were the case for the purpose of analyzing the counterbalance forces.

For the counterbalance mechanism to be in equilibrium with the load, the moment $M_o$ about the point o should be substantially zero. From FIGS. 7 and 8 we can determine the equation for the moment $M_o$ about the point o as:

$$M_o = mgl \sin \theta - K(x-x_o)t = 0$$

where K is the spring constant of the real spring 118, $x_o$ is the initial length of the effective spring formed by the segment of the first cable 124, and x is the length of the effective spring. The effective spring is the portion of the cable 124 that extends from the second pulley 112 to the third 114 or fourth 116 pulley and it is configured as a zero-length spring. The spring force of the real spring 118 is configured so that the real spring provides a spring force that is substantially proportional to the distance between the second pulley and the third pulley along the line vw.

The spring force acting through the effective spring of the cable segment creates a moment about the center of the shaft 104 by acting on an effective moment arm which has the length t of a line from the center of the shaft o normal to the line vw that represents the segment of the cable 124 that is configured as a zero-length spring. Hence, $K(x-x_o)t$ is the moment force created by the spring that counterbalances the moment created by the load 102. Since this is a zero-length spring, $x_o=0$. Rearranging the terms of the equation we have $$mgl \sin \theta = Kxt$$

With the load 102 at an angle theta (θ) to a vertical reference we can construct a right triangle oyv where the arm 110 forms the hypotenuse with a length a. The base of triangle oyv has a length of a sin θ. Using the similarity of triangle wvy to triangle wzo:

$$t/b = a \sin \theta / x$$

Rearranging the equation to solve for t:

$$t = ab \sin \theta / x$$

Substituting for t in the moment balance equation:

$$mgl \sin \theta = Kxab \sin \theta / x$$

$$mgl = Kxab/x$$

$$mgl = Kab$$

Rearranging the terms to solve for the spring constant, we have:

$$K = mgl/ab$$

Thus, the equation for the spring constant K indicates that the stiffness K of the spring 118 can be constant and independent of the angle theta θ of the link. Therefore, the load 102 may be balanced throughout its rotation if the stiffness K of the real spring 118 is properly chosen according to the equation K=mgl/ab and the extension of the real spring from its zero length is configured to be the same as the distance between the second 112 and the third pulley 114. It will be appreciated that the third 114 and fourth 116 pulleys are both substantially the same distance from the second 112 pulley. If the real spring has an initial tension, the zero length of the real spring will be its initial length minus the spring constant K times the initial tension.

Figure 9:
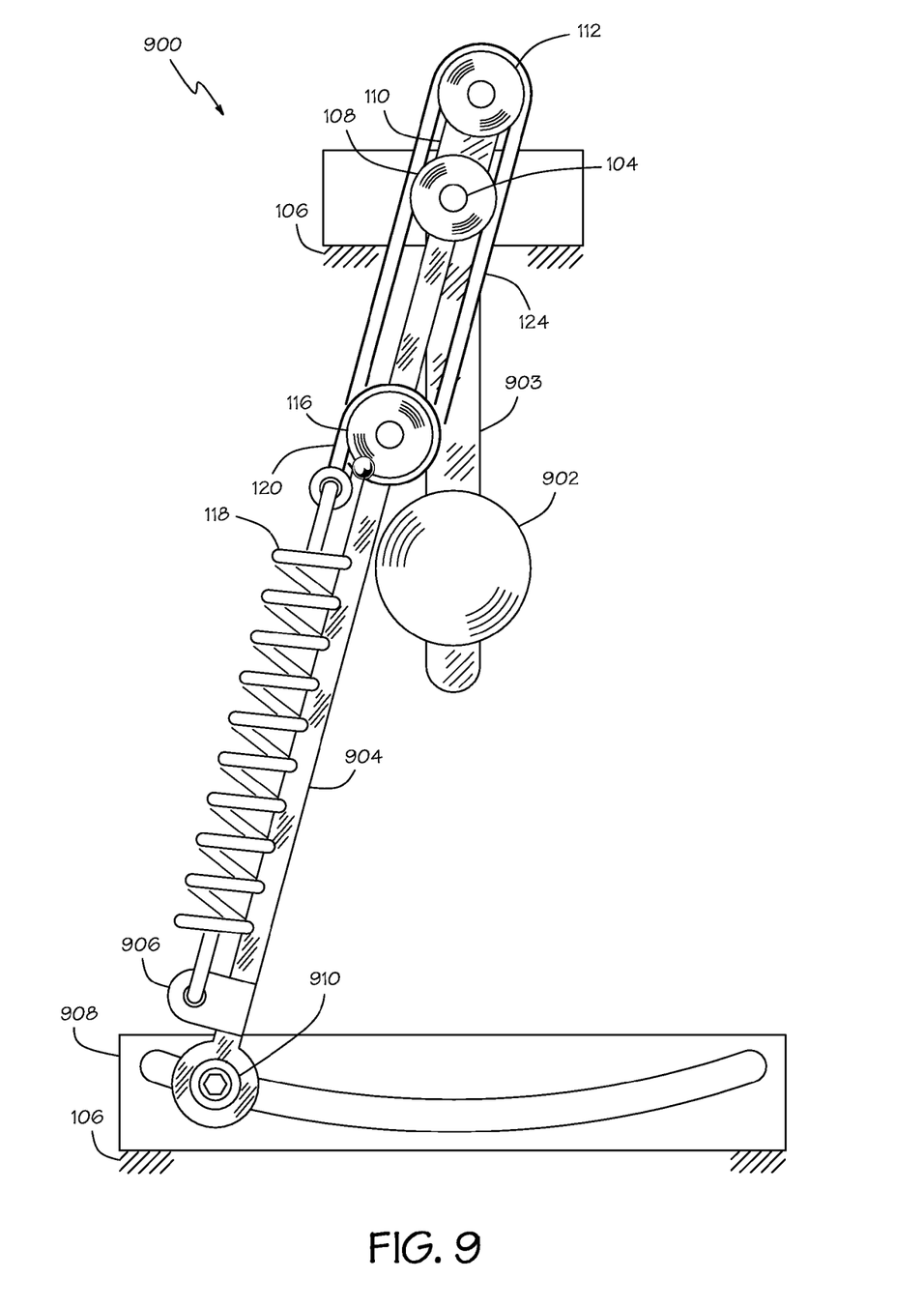
FIG. 9 is a front view of another counterbalanced system that embodies the invention.

FIG. 9 is a front view of another rotating counterbalanced system 900 that embodies the invention. Elements that are substantially the same as elements in the embodiment shown in FIGS. 1 through 6 are identified by the same reference numerals to make the similarities apparent. In the previous embodiment the center of mass of the load 102 was diametrically opposite the second pulley 112. It may be observed that this relationship is not required because the spring counterbalance mechanism provides the same counterbalancing moment regardless of orientation relative to the gravity vector.

The rotating counterbalanced system 900 shown in FIG. 9 provides an adjustment mechanism that accommodates a load 902 coupled to the rotating shaft 104 by a link 903 where the center of mass may be rotated about the shaft relative to the spring counterbalance mechanism. A beam 904 is pivotally coupled to the frame 106 at one end such that the beam pivots around the rotational axis of the shaft 104. The other end of the beam 904 is adjustably fixed to the frame 106, for example by a screw 910 that clamps the end of the beam to a member 908 with a curved slot. Thus the beam 904 provides a grounded frame member that can be set at an angle to a vertical reference that passes through the rotational axis of the shaft 104.

The third 114 and fourth 116 pulleys and the fixed end of the spring 118 are coupled to the beam. It will be appreciated that the angular position of the beam 904 will not affect the functional configuration of the spring counterbalance mechanism. As shown, the desired configuration is that the pulleys 108, 112, 114, 116 lie in a straight line with the second pulley 112 furthest from the third 114 and fourth 116 pulleys when the center of mass of the load 902 is directly below the rotational axis of the shaft 104.

Figure 10:
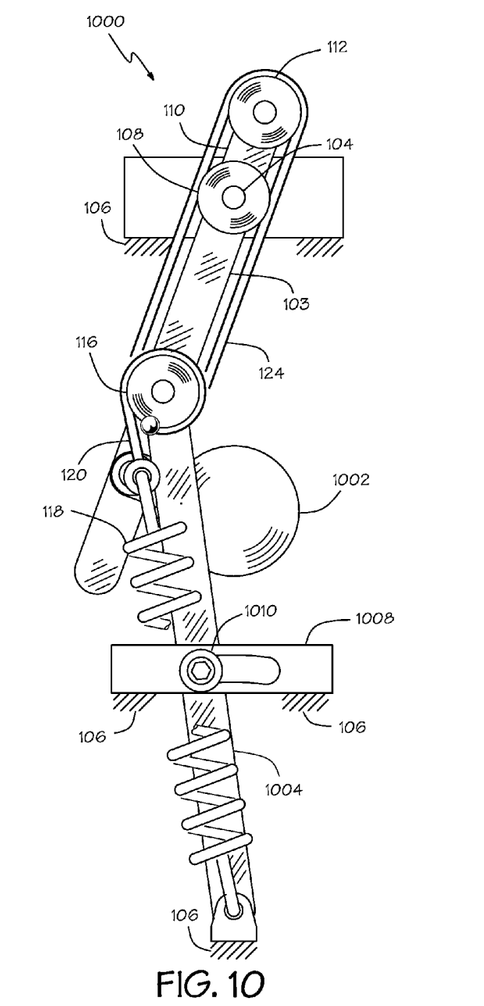
FIG. 10 is a front view of yet another counterbalanced system that embodies the invention.
Figure 11:
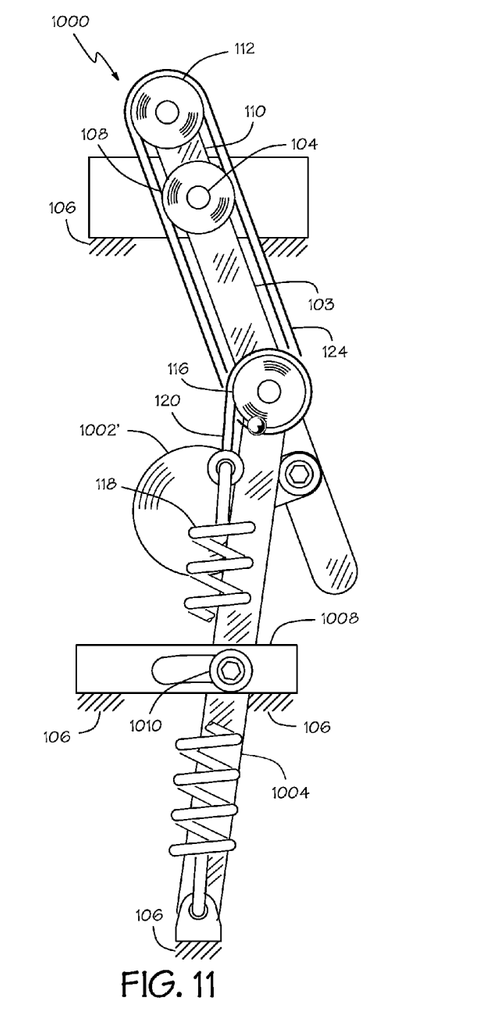
FIG. 11 is a front view of the counterbalanced system shown in FIG. 10 with the load in another position.

FIGS. 10 and 11 are front views of another rotating counterbalanced system 1000 that embodies the invention. Elements that are substantially the same as elements in the embodiment shown in FIGS. 1 through 6 are identified by the same reference numerals to make the similarities apparent. In some systems the center of mass of the load 1002 may be placed in one of two predetermined positions, for example a system that can be placed in a right handed or left handed configuration. FIG. 10 shows the load 1002 and the system 1000 in a first configuration. FIG. 11 shows the load 1002' and the system 1000 in a second configuration.

In such a system a beam 1004 may be pivotally coupled to the frame 106 at one end such that the beam pivots around the fixed end of the spring 118. The other end of the beam 1004 is adjustably fixed to the frame 106, for example by a screw 1010 that clamps the end of the beam to a member 1008 with a curved slot. Thus the beam 1004 provides a grounded frame member that can be set at an angle. The beam 1004 and the slotted member 1008 are configured such that the third 114 and fourth 116 pulleys are at one of the two intersections between a first circle that represents the line of motion as the pulleys are adjusted and a second circle that is centered on the rotational axis of the shaft 104 when the beam is at either extreme of the adjustment. It will be appreciated that the angular position of the beam 1004 will not affect the functional configuration of the spring counterbalance mechanism when it is in one the two provided configurations.

It will be observed in FIG. 2 that the cable paths of the second 112, third 114, and fourth 116 pulleys each lie in a different plane. This creates a fleet angle between the pulleys and the cable 124. It is desirable to minimize the fleet angle to reduce unbalanced side loading of the pulleys.

Figure 12:
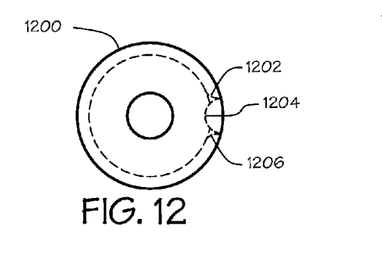
FIG. 12 is a front view of a pulley that may be used in a counterbalanced system that embodies the invention.
Figure 13:
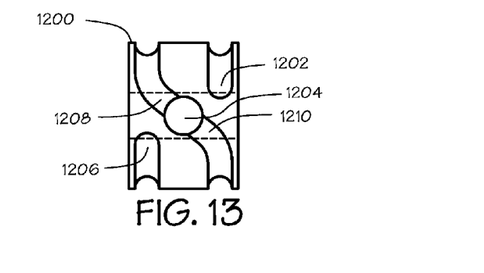
FIG. 13 is a side view of the pulley shown in FIG. 12.

FIGS. 12 and 13 show a configuration for a fourth pulley 1200 that may reduce the fleet angle. The difference between the minimum and maximum lengths of the first cable 124 may be somewhat less than the circumference of the fourth pulley. In this case, the fourth pulley will take up less than one turn of the first cable 124 when the second pulley 112 is closest to the third pulley 114. Further, the fourth pulley will take up less than one turn of the second cable 120 when the spring 118 is at its maximum extension. Thus a first groove 1202 may be provided for the first cable 124 that is parallel to the face of the pulley for a length sufficient to provide the maximum take up needed. Likewise, a second groove 1206 may be provided for the second cable 120 that is parallel to the face of the pulley for a length sufficient to provide the maximum take up needed. Thus the fleet angle does not change as the fourth pulley 1200 rotates to take up or let out the cables.

This embodiment of the fourth pulley 1200 may further include connecting grooves 1208, 1210 that permit the first 124 and second 120 cables to be portions of a single cable with the first end of the first cable adjacent the first end of the second cable. A protrusion, such as a ball or cylinder, may be attached to the cables where the first ends meet. A recess 1204 may be provided between the connecting grooves 1208, 1210 to receive the protrusion and prevent slipping of the cables on the fourth pulley 1200.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A counterbalance mechanism for counterbalancing an eccentric mass on a rotating shaft supported by a frame, the counterbalance mechanism comprising:
   a first pulley coupled to the shaft and concentric with the shaft;
   an arm coupled to the shaft adjacent the first pulley;
   a second pulley rotatably coupled to the arm at a first distance from the first pulley;
   a third pulley fixedly coupled to the frame at a second distance from the first pulley;
   a fourth pulley rotatably coupled to and concentric with the third pulley;
   a spring that is fixed at a first end to the frame and having a second end coupled to the fourth pulley such that the spring provides a restoring force as the fourth pulley is rotated; and
   a first cable having a first end that is coupled to the fourth pulley and a second end that is coupled to the third pulley after passing over the first and second pulleys.

2. The counterbalance mechanism of claim 1 wherein the spring provides a spring force that is substantially proportional to a distance between the second pulley and the third pulley.

3. The counterbalance mechanism of claim 1 further comprising a second cable having a first end that is coupled to the fourth pulley and a second end that is coupled to the spring at the second end of the spring to couple the spring to the fourth pulley.

4. The counterbalance mechanism of claim 3 wherein the first cable and the second cable are portions of a single cable with the first end of the first cable adjacent the first end of the second cable.

5. The counterbalance mechanism of claim 4 wherein the fourth pulley includes first and second grooves that are substantially parallel to faces of the fourth pulley and extending only partially around a circumference of the fourth pulley, and connecting grooves that join the first and second grooves, the connecting grooves being at substantial angles to the faces of the fourth pulley.

6. The counterbalance mechanism of claim 1 wherein the third pulley is coupled to the frame such that a position of the third pulley can be adjusted according to the angular position of the mass.

7. The counterbalance mechanism of claim 1 wherein the second distance is sufficiently greater than the first distance to permit the second pulley to pass the third pulley as the arm rotates.

8. A rotating counterbalanced system comprising:
   a frame;
   a rotating shaft supported by the frame;
   an eccentric mass coupled to the shaft;
   a first pulley coupled to the shaft and concentric with the shaft;
   an arm coupled to the shaft adjacent the first pulley;
   a second pulley rotatably coupled to the arm at a first distance from the first pulley;
   a third pulley fixedly coupled to the frame at a second distance from the first pulley;
   a fourth pulley rotatably coupled to and concentric with the third pulley;
   a spring that is fixed at a first end to the frame and having a second end coupled to the fourth pulley such that the spring provides a restoring force as the fourth pulley is rotated; and a first cable having a first end that is coupled to the fourth pulley and a second end that is coupled to the third pulley after passing over the first and second pulleys.

9. The counterbalanced system of claim 8 wherein the spring provides a spring force that is substantially proportional to a distance between the second pulley and the third pulley.

10. The counterbalanced system of claim 8 further comprising a second cable having a first end that is coupled to the fourth pulley and a second end that is coupled to the spring at the second end of the spring to couple the spring to the fourth pulley.

11. The counterbalanced system of claim 10 wherein the first cable and the second cable are portions of a single cable with the first end of the first cable adjacent the first end of the second cable.

12. The counterbalanced system of claim 8 wherein the fourth pulley includes first and second grooves that are substantially parallel to faces of the fourth pulley and extending only partially around a circumference of the fourth pulley, and connecting grooves that join the first and second grooves, the connecting grooves being at substantial angles to the faces of the fourth pulley.

13. The counterbalanced system of claim 8 wherein the third pulley is coupled to the frame such that a position of the third pulley can be adjusted according to the angular position of the mass.

14. The counterbalanced system of claim 8 wherein the second distance is sufficiently greater than the first distance to permit the second pulley to pass the third pulley as the arm rotates.

15. A counterbalance mechanism for counterbalancing an eccentric mass on a rotating shaft supported by a frame, the counterbalance mechanism comprising:
- a first pulley coupled to the shaft and concentric with the shaft;
- a second pulley;
- means for holding the second pulley at a first distance from the first pulley such that the second pulley rotates about the center of both the first pulley and the second pulley;
- a third pulley fixedly coupled to the frame at a second distance from the first pulley;
- a fourth pulley rotatably coupled to and concentric with the third pulley;
- a first cable having a first end that is coupled to the fourth pulley and a second end that is coupled to the third pulley after passing over the first and second pulleys; and
- means for providing a restoring force as the fourth pulley is rotated.

16. The counterbalance mechanism of claim 15 wherein the means for providing a restoring force provides a restoring force that is substantially proportional to a distance between the second pulley and the third pulley.

17. The counterbalance mechanism of claim 15 wherein the means for providing a restoring force comprises a tension spring coupled to the frame at a first end and coupled to the fourth pulley at a second end of the spring by a second cable.

18. The counterbalance mechanism of claim 17 wherein the first cable and the second cable are portions of a single cable with the first end of the first cable adjacent the first end of the second cable.

19. The counterbalance mechanism of claim 15 wherein the fourth pulley includes first and second grooves that are substantially parallel to faces of the fourth pulley and extending only partially around a circumference of the fourth pulley, and connecting grooves that join the first and second grooves, the connecting grooves being at substantial angles to the faces of the fourth pulley.

20. The counterbalance mechanism of claim 15 further comprising means for adjusting a position of the third pulley according to the angular position of the mass.

21. The counterbalance mechanism of claim 15 wherein the second distance is sufficiently greater than the first distance to permit the second pulley to pass the third pulley as the second pulley rotates about the center of the first pulley.

22. The counterbalance mechanism of claim 15 further comprising means for adjusting a position of the third pulley to provide either of a right handed configuration and a left handed configuration.

23. The counterbalance mechanism of claim 1 wherein the third pulley is coupled to the frame such that a position of the third pulley can be adjusted to provide either of a right handed configuration and a left handed configuration.

24. The counterbalanced system of claim 8 wherein the third pulley is coupled to the frame such that a position of the third pulley can be adjusted to provide either of a right handed configuration and a left handed configuration.

* * * * *